(12) United States Patent
Chang

(10) Patent No.: US 7,181,546 B2
(45) Date of Patent: Feb. 20, 2007

(54) NETWORK COMMUNICATION DISPLAY DEVICE

(75) Inventor: Chia Ming Chang, Taipei (TW)

(73) Assignee: Cameo Communications Inc., Sijhih (TW)

( * ) Notice: Subject to any disclaimer, the term of this patent is extended or adjusted under 35 U.S.C. 154(b) by 885 days.

(21) Appl. No.: 10/392,607

(22) Filed: Mar. 21, 2003

(65) Prior Publication Data

US 2004/0199628 A1    Oct. 7, 2004

(51) Int. Cl.
*G06F 15/16* (2006.01)
(52) U.S. Cl. ..................................................... 709/250
(58) Field of Classification Search ................ 709/250, 709/217, 220, 223, 218
See application file for complete search history.

(56) References Cited

U.S. PATENT DOCUMENTS

| | | | |
|---|---|---|---|
| 6,448,978 B1* | 9/2002 | Salvador et al. ............ | 715/741 |
| 6,678,827 B1* | 1/2004 | Rothermel et al. ............ | 726/6 |
| 6,970,919 B1* | 11/2005 | Doi et al. .................... | 709/220 |
| 2002/0016823 A1* | 2/2002 | Ueno et al. .................. | 709/206 |
| 2002/0019866 A1* | 2/2002 | Linzy .......................... | 709/223 |
| 2003/0097575 A1* | 5/2003 | Owada et al. ............... | 713/189 |
| 2003/0131316 A1* | 7/2003 | Brown et al. ................ | 715/513 |
| 2004/0058652 A1* | 3/2004 | McGregor et al. ........ | 455/67.13 |

* cited by examiner

*Primary Examiner*—Bunjob Jaroenchonwanit
*Assistant Examiner*—Lan-Dai Truong
(74) *Attorney, Agent, or Firm*—Alan D. Kamrath; Nikolai & Mersereau, P.A.

(57) ABSTRACT

A network communication display device serves for receiving signals from a central processing unit which receiving data from computer units in a wireless network. The network communication display device has a liquid crystal display connected to the central processing unit. The liquid crystal display includes a network communication display structure. The network communication display structure comprises a linkage times display unit; a load condition display unit; an interruption distance display unit; an encryption key display unit; a linkage display unit; an uplink and downlink display unit; a WEBPAGE display unit; a multiple-language display unit; and a welcome and congratulation window display unit. Thereby, the communication conditions are displayed by a liquid crystal display through a network router.

1 Claim, 4 Drawing Sheets

NETWORK COMMUNICATION DISPLAY DEVICE

FIELD OF THE INVENTION

The present invention relates to liquid crystal displays, and particularly to a network communication display device, which can display detail messages about the network so that the users can know more conditions of the network and well control related network devices.

BACKGROUND OF THE INVENTION

Referring to FIG. 1, in the prior art, a wireless wideband network router 1 displays the network connection message by flashing a plurality of light emitting diodes 10. All the network transmission messages are displayed by light emitting diodes 10. However, by this way, only finite messages are display, but the details of the network condition, such as linkage times, interruption distance, encryption key condition, network communications, multiple-languages, uplink and downlink, WEBPAGE conditions, and welcome and congratulation sentences can not be displayed.

Therefore there is an eager demand for a novel design which can improve above mentioned prior art defects.

SUMMARY OF THE INVENTION

Accordingly, the primary object of the present invention is to provide to provide a network communication display device for receiving signals from a central processing unit which receiving data from computer units in a wireless network; the network communication display device having a liquid crystal display connected to the central processing unit; the liquid crystal display including a network communication display structure; the network communication display structure comprising: a linkage times display unit for displaying the number of people linking to the network; a load condition display unit for displaying loads of the network. an interruption distance display unit for displaying a distance to an interruption position in the network; an encryption key display unit for displaying whether output data in the network is encrypted; a linkage display unit displaying a linkage condition of the network; an uplink and downlink display unit for displaying uplink and downlink condition; a WEBPAGE display unit for displaying web pages; and a multiple-language display unit for displaying languages used; and a welcome and congratulation window display unit connected to the liquid crystal display for displaying welcome and congratulation sentences.

The various objects and advantages of the present invention will be more readily understood from the following detailed description when read in conjunction with the appended drawing.

BRIEF DESCRIPTION OF THE PREFERRED EMBODIMENTS

Figure 1:
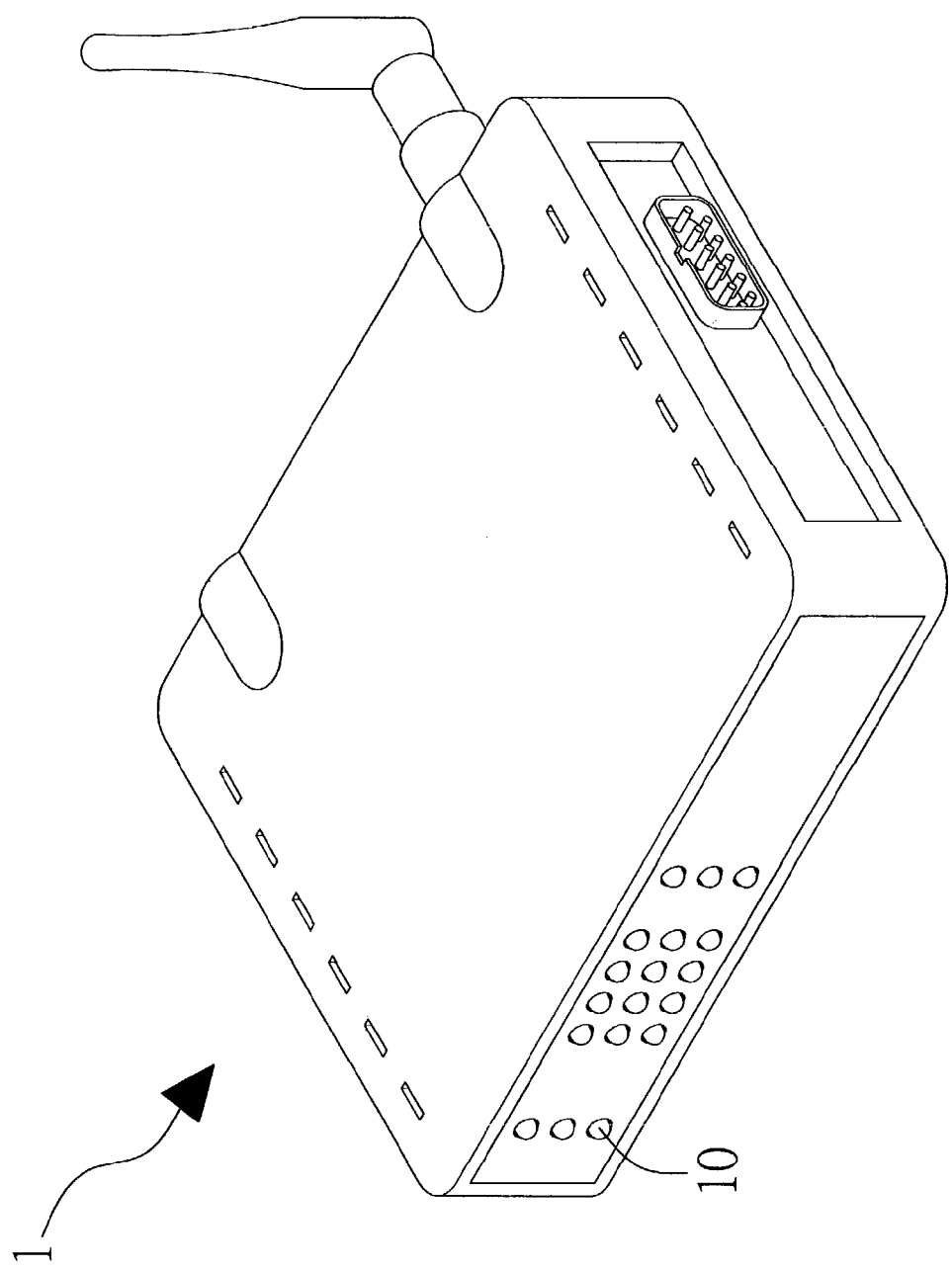
FIG. 1 is a schematic view of a prior art showing that a wired network router is connected to a computer.
Figure 2:
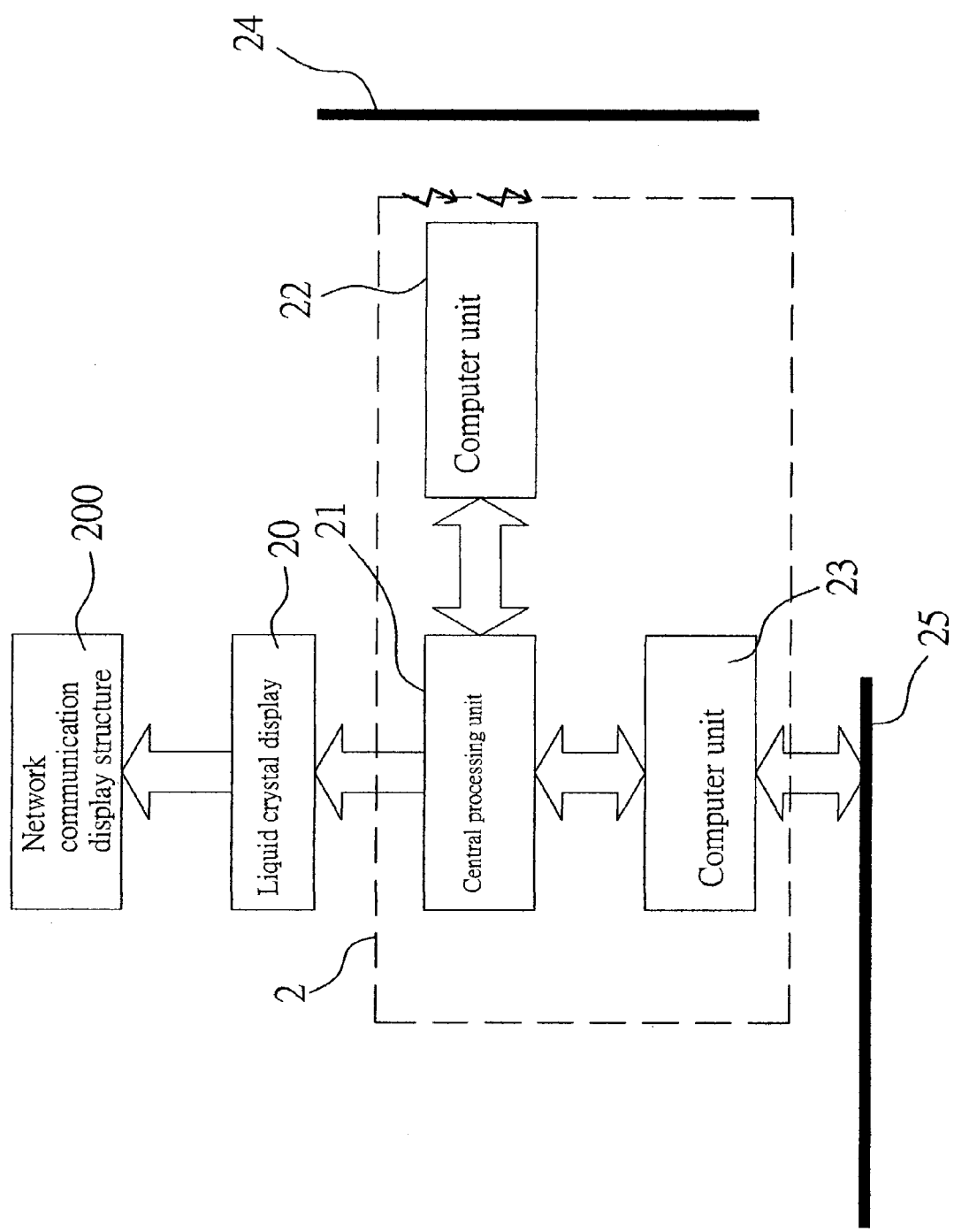
FIG. 2 is a block diagram of the present invention.
Figure 3:
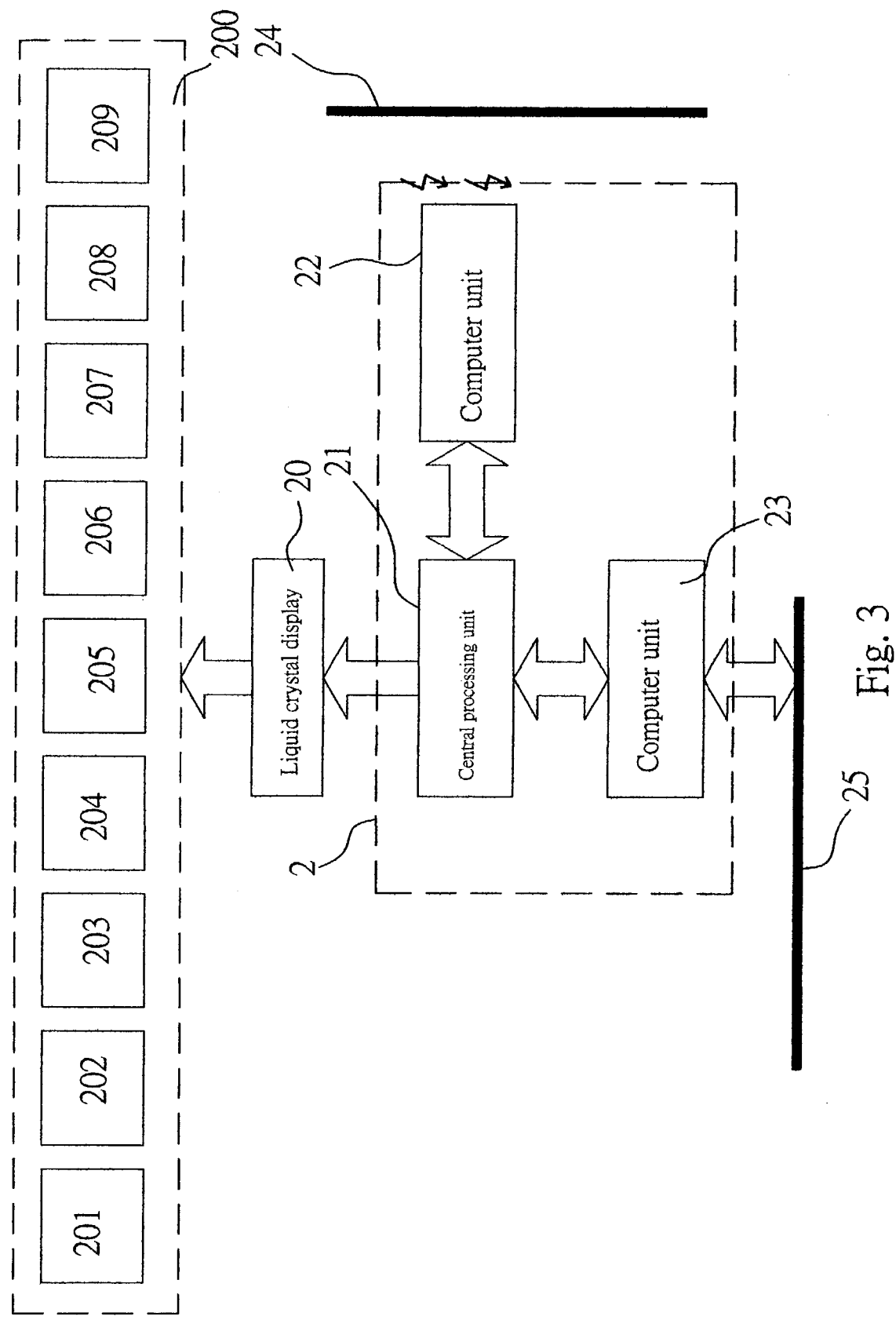
FIG. 3 is a function block diagram of the liquid crystal display of the present invention.

Referring to FIGS. 2 and 3, a network communication display device of the present invention includes a liquid crystal displaying interface device 2. The liquid crystal displaying interface device 2 has a liquid crystal display 20 which is electrically connected to a central processing unit 21 for receiving signals from the computer units 22 and 23. The computer unit 22 is connected to a wireless network 24, and the computer unit 23 is connected to a wireless network 25. The liquid crystal display 20 is connected to a network communication display structure 200. The network communication display structure 200 comprises the following elements.

A linkage times display unit 201 is connected to the liquid crystal display 20 for showing the number of people linking to the network.

A load condition display unit 202 is connected to the liquid crystal display 20 for showing the loads of the network.

An interruption distance display unit 203 is connected to the liquid crystal display 20 for displaying a distance to an interruption position in the network.

An encryption key display unit 204 is connected to the liquid crystal display 20 for displaying whether output data of the network is encrypted.

A linkage display unit 205 is connected to the liquid crystal display 20 for displaying a linkage condition of the network.

An uplink and downlink display unit 206 is connected to the liquid crystal display 20 for displaying uplink and downlink condition.

A WEBPAGE display unit 207 is connected to the liquid-crystal display 20 for displaying web pages.

A multiple-language display unit 208 is connected to the liquid crystal display 20 for displaying languages used.

A welcome and congratulation window display unit 209 is connected to the liquid crystal display 20 for displaying welcome and congratulation sentences.

Figure 4:
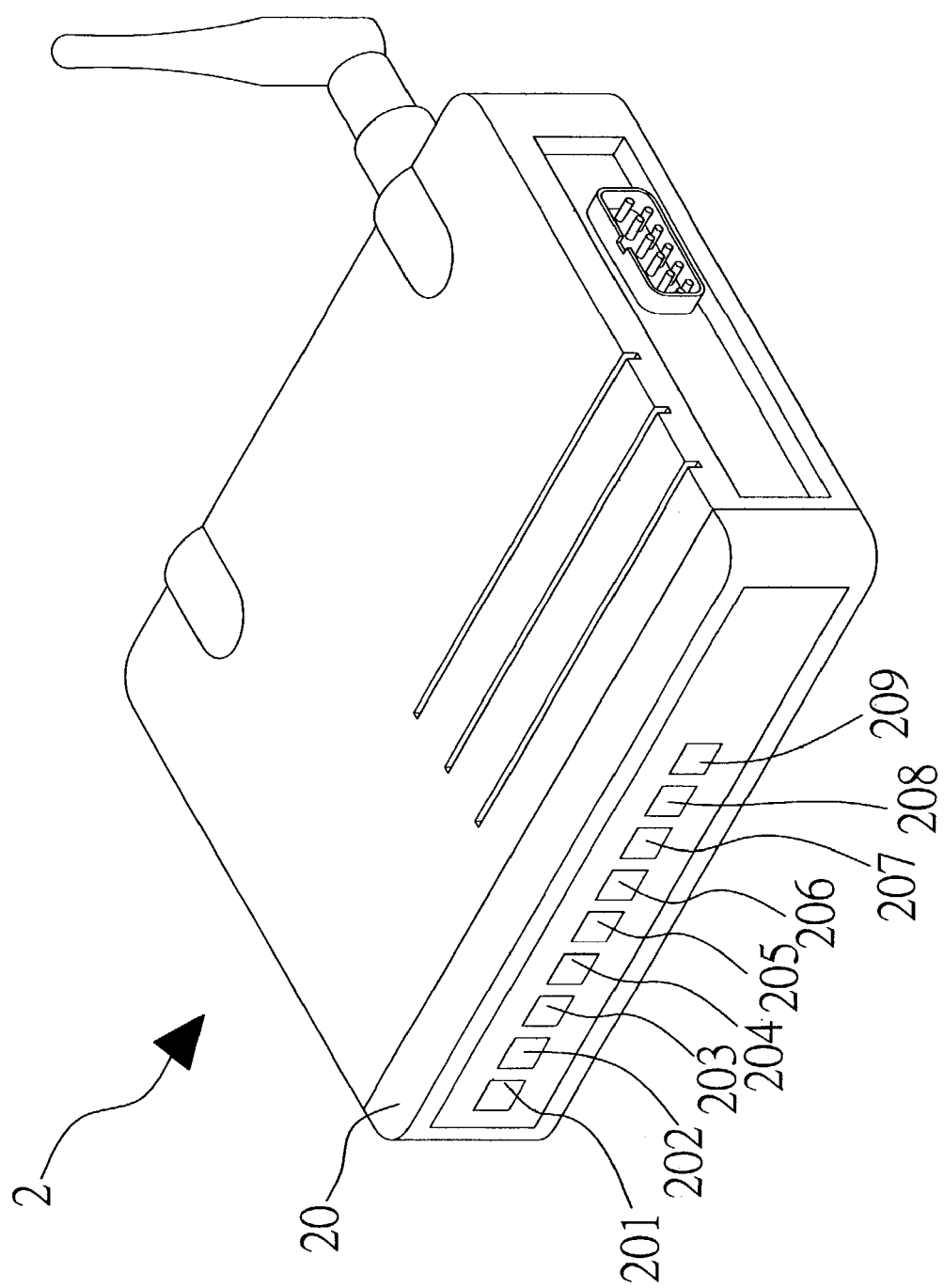
FIG. 4 shows one application of the present invention.

With reference to FIG. 4, in the present invention, the network communication display device 2 is assembled in a package. The liquid crystal display 20 is installed in the network communication display device. A front end of the liquid crystal display 20 has the linkage times display unit 201, load condition display unit 202, interruption distance display unit 203, encryption key display unit 204, linkage display unit 205, uplink and downlink display unit 206, WEBPAGE display unit 207, multiple-language display unit 208 and welcome and congratulation window display unit 209. The central processing unit 21 outputs network communication conditions and the conditions are displayed in the liquid crystal display 20.

Advantages of the present invention is that the communication conditions are displayed through a network router. The linkage condition and control mode can be viewed from the network router. The working mode of the router can be controlled through a web page and the working mode can be displayed by liquid crystal display. Moreover, the present invention is safe and practical.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A network communication display device for receiving signals from a central processing unit which receives data from computer units in a wireless network; the network communication display device having a liquid crystal display connected to the central processing unit; the liquid crystal display including a network communication display structure; the network communication display structure comprising:

a linkage times display unit connected to the liquid crystal display for displaying the number of people linking to the network;

a load condition display unit connected to the liquid crystal display for displaying loads of the network;

an interruption distance display unit connected to the liquid crystal display for displaying a distance to an interruption position in the network;

an encryption key display unit connected to the liquid crystal display for displaying whether output data in the wireless network is encrypted;

a linkage display unit connected to the liquid crystal display for displaying a linkage condition of the network;

an uplink and downlink display unit connected to the liquid crystal display for displaying uplink and downlink conditions;

a WEBPAGE display unit connected to the liquid crystal display for displaying web pages;

a multiple-language display unit connected to the liquid crystal display for displaying languages used; and a welcome and congratulation window display unit connected to the liquid crystal display for displaying welcome and congratulation sentences.

* * * * *